US011631323B2

(12) United States Patent
Balasubramanian et al.

(10) Patent No.: US 11,631,323 B2
(45) Date of Patent: Apr. 18, 2023

(54) MOVEMENT-BASED EVENT REPORTING FOR A VULNERABLE ROAD USER DEVICE

(71) Applicant: QUALCOMM Incorporated, San Diego, CA (US)

(72) Inventors: Anantharaman Balasubramanian, San Diego, CA (US); Sudhir Kumar Baghel, Hillsborough, NJ (US); Kapil Gulati, Hillsborough, NJ (US); Taesang Yoo, San Diego, CA (US); Shailesh Patil, San Diego, CA (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 16/946,802

(22) Filed: Jul. 7, 2020

(65) Prior Publication Data

US 2022/0013007 A1    Jan. 13, 2022

(51) Int. Cl.
| | |
|---|---|
| *G08G 1/056* | (2006.01) |
| *H04W 4/40* | (2018.01) |
| *G08G 1/052* | (2006.01) |
| *H04W 4/02* | (2018.01) |

(52) U.S. Cl.
CPC ............ *G08G 1/056* (2013.01); *G08G 1/052* (2013.01); *H04W 4/026* (2013.01); *H04W 4/027* (2013.01); *H04W 4/40* (2018.02)

(58) Field of Classification Search
CPC ....... B60W 30/09; G08G 1/052; G08G 1/056; G08G 1/0967; G08G 1/16; H04L 65/1069; H04L 67/12; H04W 4/023; H04W 4/026; H04W 4/027; H04W 4/06; H04W 4/40; H04W 4/46

USPC .......................................... 340/935
See application file for complete search history.

(56) References Cited

U.S. PATENT DOCUMENTS

| | | | |
|---|---|---|---|
| 8,589,061 B2* | 11/2013 | Bengtsson | G08G 1/165 340/436 |
| 9,462,423 B1* | 10/2016 | Rivlin | H04W 4/043 |
| 10,687,171 B1* | 6/2020 | Snyder | H04W 4/026 |
| 10,917,395 B2* | 2/2021 | Reece | H04L 67/52 |
| 2013/0210460 A1* | 8/2013 | Subramanian | B61L 29/28 455/456.3 |
| 2014/0009275 A1 | 1/2014 | Bowers et al. | |

(Continued)

FOREIGN PATENT DOCUMENTS

| | | |
|---|---|---|
| WO | 2019132082 A1 | 7/2019 |
| WO | 2020013796 A1 | 1/2020 |

OTHER PUBLICATIONS

International Search Report and Written Opinion—PCT/US2021/070490—ISA/EPO—dated Jul. 19, 2021.

*Primary Examiner* — Stephen R Burgdorf
(74) *Attorney, Agent, or Firm* — Qualcomm Incorporated

(57) ABSTRACT

Various aspects of the present disclosure generally relate to wireless communication. In some aspects, a vulnerable road unit (VRU) device may determine that a parameter associated with movement of the VRU device satisfies one or more thresholds indicated in an event reporting configuration. The VRU device may transmit, to a vehicle user equipment device, an indication of an event associated with the VRU device based at least in part on determining that the parameter satisfies the one or more thresholds. Numerous other aspects are provided.

32 Claims, 8 Drawing Sheets

(56) References Cited

U.S. PATENT DOCUMENTS

| | | | |
|---|---|---|---|
| 2016/0318445 A1* | 11/2016 | Sugimoto | B60W 60/0027 |
| 2017/0374530 A1 | 12/2017 | Ramasamy | |
| 2018/0262865 A1* | 9/2018 | Lepp | H04W 52/0235 |
| 2018/0310147 A1* | 10/2018 | Kim | H04W 4/40 |
| 2018/0376417 A1* | 12/2018 | Wang | H04W 52/0216 |
| 2019/0053154 A1* | 2/2019 | Song | H04W 4/48 |
| 2020/0372727 A1* | 11/2020 | Sudhir | G07C 5/0841 |
| 2021/0012661 A1 | 1/2021 | Yang et al. | |
| 2021/0235246 A1* | 7/2021 | Hovey | H04W 4/021 |
| 2021/0243727 A1* | 8/2021 | Zhao | H04W 72/0486 |
| 2022/0135027 A1* | 5/2022 | Bravi | G06T 7/20 701/119 |

* cited by examiner

MOVEMENT-BASED EVENT REPORTING FOR A VULNERABLE ROAD USER DEVICE

FIELD OF THE DISCLOSURE

Aspects of the present disclosure generally relate to generally relate to vehicle to everything (V2X) communication and, for example, to movement-based event reporting for a vulnerable roadside user (VRU) device.

BACKGROUND

User equipments (UEs) may communicate directly using one or more sidelink channels (e.g., without using a base station as an intermediary to communicate with one another). For example, UEs may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like.

SUMMARY

In some aspects, a method includes determining, by a vulnerable road user (VRU) device, that a parameter associated with movement of the VRU device satisfies one or more thresholds indicated in an event reporting configuration; and transmitting, by the VRU device and to a vehicle user equipment (VUE) device, an indication of an event associated with the VRU device based at least in part on determining that the parameter satisfies the one or more thresholds.

In some aspects, a method includes transmitting, by a VUE device, a communication that indicates a request for a VRU device to report one or more types of events, associated with movement of the VRU device, to the VUE device; and receiving, by the VUE device, an indication of an event associated with the VRU device, wherein an event type of the event is included in the one or more types of events for which the communication indicated the request for the VRU device to report.

In some aspects, a VRU device for wireless communication includes a memory; and one or more processors operatively coupled to the memory, the memory and the one or more processors configured to determine that a parameter associated with movement of the VRU device satisfies one or more thresholds indicated in an event reporting configuration; and transmit, to a VUE device, an indication of an event associated with the VRU device based at least in part on determining that the parameter satisfies the one or more thresholds.

In some aspects, a VUE device for wireless communication includes a memory; and one or more processors operatively coupled to the memory, the memory and the one or more processors configured to transmit a communication that indicates a request for a VRU device to report one or more types of events, associated with movement of the VRU device, to the VUE device; and receive, from the VRU device, an indication of an event associated with the VRU device, wherein an event type of the event is included in the one or more types of events for which the communication indicated the request for the VRU device to report.

In some aspects, a non-transitory computer-readable medium may store one or more instructions for wireless communication. The one or more instructions, when executed by one or more processors of a VRU device, may cause the one or more processors to determine that a parameter associated with movement of the VRU device satisfies one or more thresholds indicated in an event reporting configuration; and transmit, to a VUE device, an indication of an event associated with the VRU device based at least in part on determining that the parameter satisfies the one or more thresholds.

In some aspects, a non-transitory computer-readable medium may store one or more instructions for wireless communication. The one or more instructions, when executed by one or more processors of a VUE device, may cause the one or more processors to transmit a communication that indicates a request for a VRU device to report one or more types of events, associated with movement of the VRU device, to the VUE device; and receive, from the VRU device, an indication of an event associated with the VRU device, wherein an event type of the event is included in the one or more types of events for which the communication indicated the request for the VRU device to report.

In some aspects, an apparatus for wireless communication may include means for determining that a parameter associated with movement of the apparatus satisfies one or more thresholds indicated in an event reporting configuration; and means for transmitting, to a VUE device, an indication of an event associated with the apparatus based at least in part on determining that the parameter satisfies the one or more thresholds.

In some aspects, an apparatus for wireless communication may include means for transmitting a communication that indicates a request for a VRU device to report one or more types of events, associated with movement of the VRU device, to the apparatus; and means for receiving, from the VRU device, an indication of an event associated with the VRU device, wherein an event type of the event is included in the one or more types of events for which the communication indicated the request for the VRU device to report Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
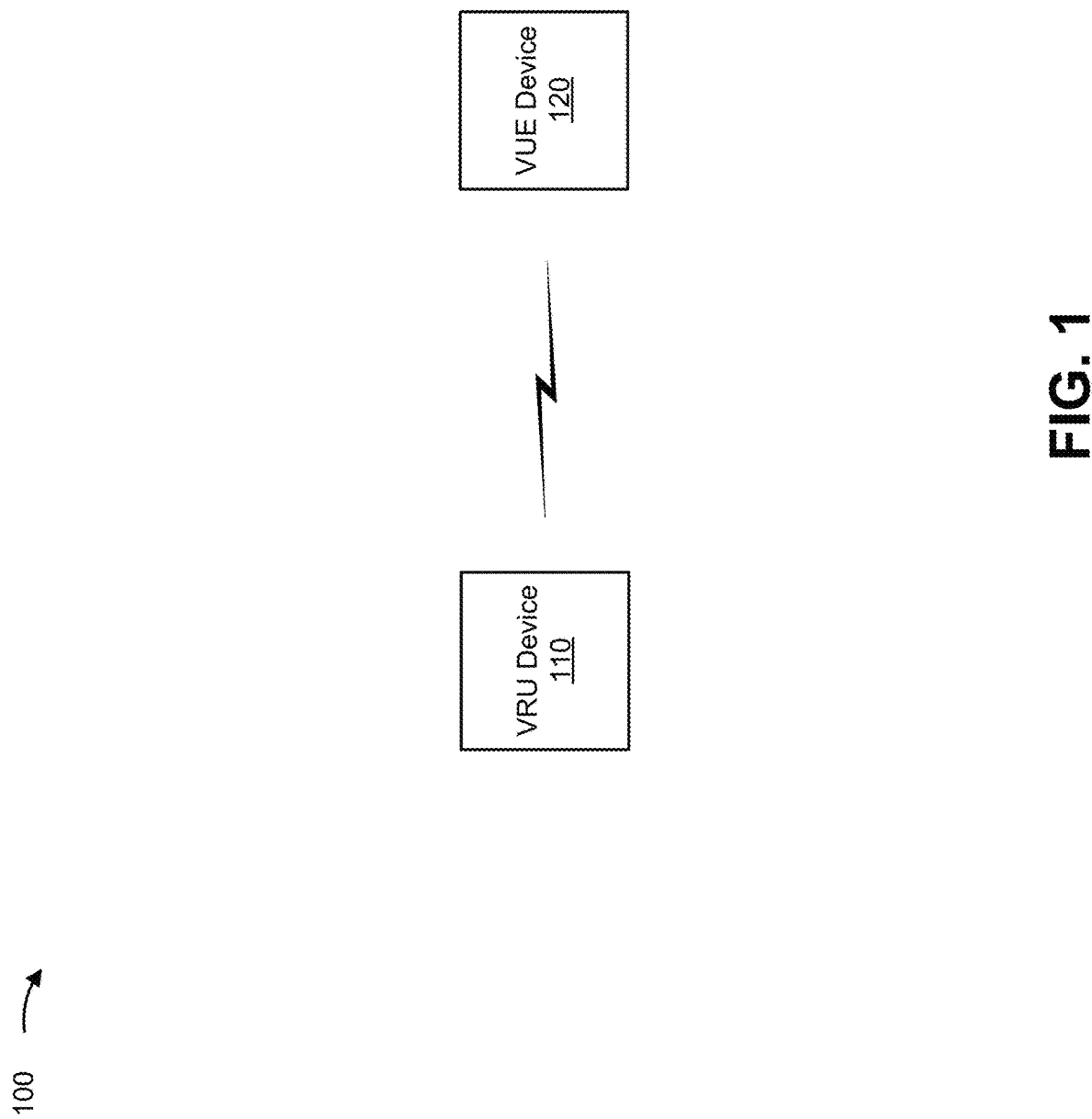
FIG. 1 is a diagram illustrating an example environment in which a vulnerable roadside unit (VRU) device and a vehicle user equipment (VUE) device described herein may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A vehicle user equipment (VUE) device may be a user equipment (UE) associated with and/or integrated into a vehicle. A VUE device may be an electronic control unit (ECU) of a vehicle, a telematics control unit (TCU), a wireless communication device included in a vehicle, or another type of device and/or component(s) capable of communicating using various types of wireless communication protocols. A vulnerable roadside user (VRU) device may be a UE or another type of wireless communication device associated with a VRU. A VRU may be a user such as a pedestrian, a bicyclist, and/or the like that is located near a vehicle, near a road or another area where vehicles travel, and/or the like.

A VUE device and a VRU device may be configured to communicate with each other on a sidelink (e.g., without using a base station as an intermediary to communicate with one another). For example, advances in communication technologies have enabled various types of sidelink communications such as vehicle-to-everything (V2X) communication, which may include vehicle-to-vehicle (V2V) communication, vehicle-to-pedestrian (V2P) communication, and/or the like. In some cases, a VUE device may be configured to share information (e.g., using V2X communication) with a VRU device. For example, a VUE device may transmit vehicle information and/or alerts to a VRU device to cause or permit the VRU device to use a user interface component to warn an associated VRU of the presence of a vehicle associated with the VUE device, indicate a location of the vehicle, provide information associated with the vehicle, and/or the like.

A VRU device may transmit periodic status reports to a VUE device to provide information associated with a position of the VRU device, movement of the VRU device, and/or the like. The VUE device may receive the periodic status reports, may determine to transmit an alert to the VRU device based at least in part on the information included in the periodic status reports, and may transmit the alert to the VRU device. However, in some cases, the VUE device may be unable to track sudden movements of the VRU device (such as if an associated VRU were to make a sudden attempt to cross a road in front of a vehicle associated with the VUE device) quickly enough to alert the VRU device of the impending safety concern. In other cases, the VRU device may waste battery resources, memory resources, processing resources, and radio resources transmitting periodic status reports to the VUE device when the VRU device is experiencing little movement (such as when the VRU associated with the VRU device is walking in a straight line or standing still).

According to some aspects described herein, a VRU device may be requested to provide indications of movement-based events to a VUE device. A movement-based event may provide an indication of a particular type of movement of the VRU device that may indicate sudden movement of the VRU device, may indicate a sudden change in movement of the VRU device, may indicate movement that might lead to a safety issue for the VRU associated with the VRU device, and/or the like. The movement-based alerts may permit the VUE device to more quickly identify (with or without additional information from periodic status reports) impending safety concerns for the VRU associated with the VRU device, which permits the VUE device to more quickly provide alerts to the VRU device. This increases the safety of the VRU.

Moreover, the VRU device may be requested to reduce the frequency of periodic status reports (e.g., to increase the time duration between transmitting the periodic status reports) prior to determining that a movement-based event has occurred, which increases power efficiency of the VRU device, conserves battery resources, memory resources, processing resources, and radio resources of the VRU device, and/or the like.

FIG. 1 is a diagram of an example environment 100 in which systems and/or methods described herein may be implemented. As shown in FIG. 1, environment 100 may include a VRU device 110 and a VUE device 120. VRU device 110 and VUE device 120 may communicate on a sidelink using V2X communications, V2P communications, and/or other types of sidelink communications. Moreover, VRU device 110 and VUE device 120 may communicate on various sidelink physical channels, such as a physical sidelink control channel (PSCCH), a physical sidelink shared channel (PSSCH), a physical sidelink feedback channel (PSFCH), and/or other types of sidelink physical channels.

In some aspects, VRU device 110 and VUE device 120 may be included in a wireless network. The wireless network may be a cellular network (e.g., a Long Term Evolution (LTE) network, a fifth generation New Radio (5G NR)

network, and/or another type of cellular network), a wide area network (WAN), a Wi-Fi network, a mixed technology network (e.g., a cellular and a Wi-Fi network), and/or another type of wireless network.

VRU device 110 includes one or more devices capable of receiving, generating, storing, processing, transmitting, and/or providing information associated with movement-based event reporting, as described herein. For example, VRU device 110 may include a communication and/or computing device, such as a UE or a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device. VRU device 110 includes a V2X compatible and/or V2X device that is capable of communicating with other V2X devices (e.g., on a sidelink), as described herein. VRU device 110 may include a sensor system that includes one or more sensors that are used to generate and/or provide movement data (e.g., to VUE device 120) associated with VRU device 110.

VUE device 120 may include any vehicle or device associated with a vehicle that is capable of transmitting and/or receiving V2X communications (e.g., on a sidelink), as described herein. For example, VUE device 120 may be a consumer vehicle, an industrial vehicle, a commercial vehicle, and/or the like. VUE device 120 may be capable of traveling and/or providing transportation via public roadways, may be capable of use in operations associated with a worksite (e.g., a construction site), and/or the like. VUE device 120 may include a sensor system that includes one or more sensors that are used to generate and/or provide vehicle data (e.g., to VRU device 110) associated with VUE device 120.

As another example, a vehicle may be controlled by VUE device 120, which may include one or more devices capable of receiving, generating, storing, processing, and/or providing information associated with movement-based event reporting, described herein. For example, VUE device 120 may include and/or be a component of a communication and/or computing device, such as, an ECU, an onboard computer, a control console, an operator station, a UE associated with the vehicle, or a similar type of device. In some aspects, VUE device 120 may include and/or be used to provide V2X communication, vehicle data associated with the vehicle (e.g., identification information, sensor data, and/or the like), as described herein. For example, VUE device 120 may permit the vehicle to have one or more onboard capabilities associated with sharing vehicle information associated with the vehicle, as described herein, with VRU device 110.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
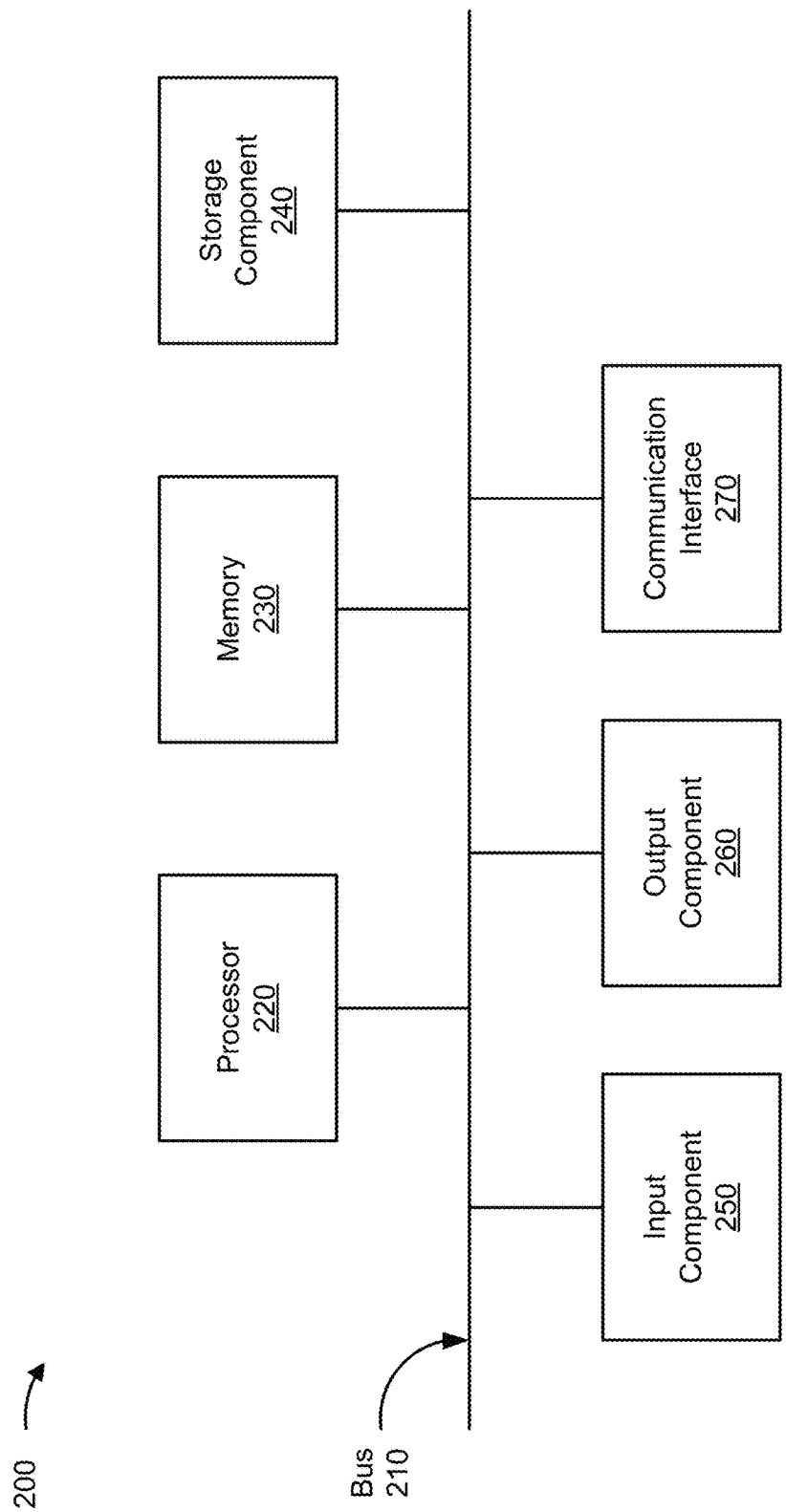
FIG. 2 is a diagram illustrating example components of one or more devices shown in FIG. 1, such as a VRU device and a VUE device, in accordance with various aspects of the present disclosure.

FIG. 2 is a diagram of example components of a device 200. Device 200 may correspond to VRU device 110, VUE device 120, and/or the like. In some aspects, VRU device 110, VUE device 120, and/or the like may include one or more devices 200 and/or one or more components of device 200. As shown in FIG. 2, device 200 may include a bus 210, a processor 220, a memory 230, a storage component 240, an input component 250, an output component 260, and a communication interface 270.

Bus 210 includes a component that permits communication among multiple components of device 200. Processor 220 is implemented in hardware, firmware, and/or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 250 includes a component that permits device 200 to receive information, such as via user input (e.g., a touch screen display, a keyboard, a keypad, a mouse, a button, a switch, a microphone, a camera, and/or the like). Additionally, or alternatively, input component 250 may include a component for determining location (e.g., a global positioning system (GPS) component) and/or a sensor (e.g., an accelerometer, a gyroscope, an actuator, another type of positional or environmental sensor, and/or the like). Output component 260 includes a component that provides output information from device 200 (via, e.g., a display, a speaker, a haptic feedback component, an audio or visual indicator, and/or the like).

Communication interface 270 includes a transceiver-like component (e.g., a transceiver, a separate receiver, a separate transmitter, and/or the like) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, and/or the like.

Device 200 may perform one or more processes described herein. Device 200 may perform these processes based at least in part on processor 220 executing software instructions stored by a non-transitory computer-readable medium, such as memory 230 and/or storage component 240. As used herein, the term "computer-readable medium" refers to a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardware circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, the means for performing the processes and/or operations described herein may include bus 210, processor 220, memory 230, storage component 240, input component 250, output component 260, communication interface 270, and/or any combination thereof.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

FIGS. 3A-3D are diagrams illustrating one or more examples 300 associated with movement-based event reporting for a VRU device, in accordance with various aspects of the present disclosure. As shown in FIGS. 3A-3D, example(s) 300 may include communication between a VRU device 110 and a VUE device 120. VRU device 110 may be associated with a VRU located and/or traveling near a path of travel of a vehicle (e.g., a road, a street, a highway, or another location where vehicles travel). VUE device 120 may be associated with the vehicle. In some aspects, the techniques described herein may be used in scenarios in which the vehicle and the VRU are traveling off road, such as at or near a job side or a construction site, or another off road location.

Figure 3A:
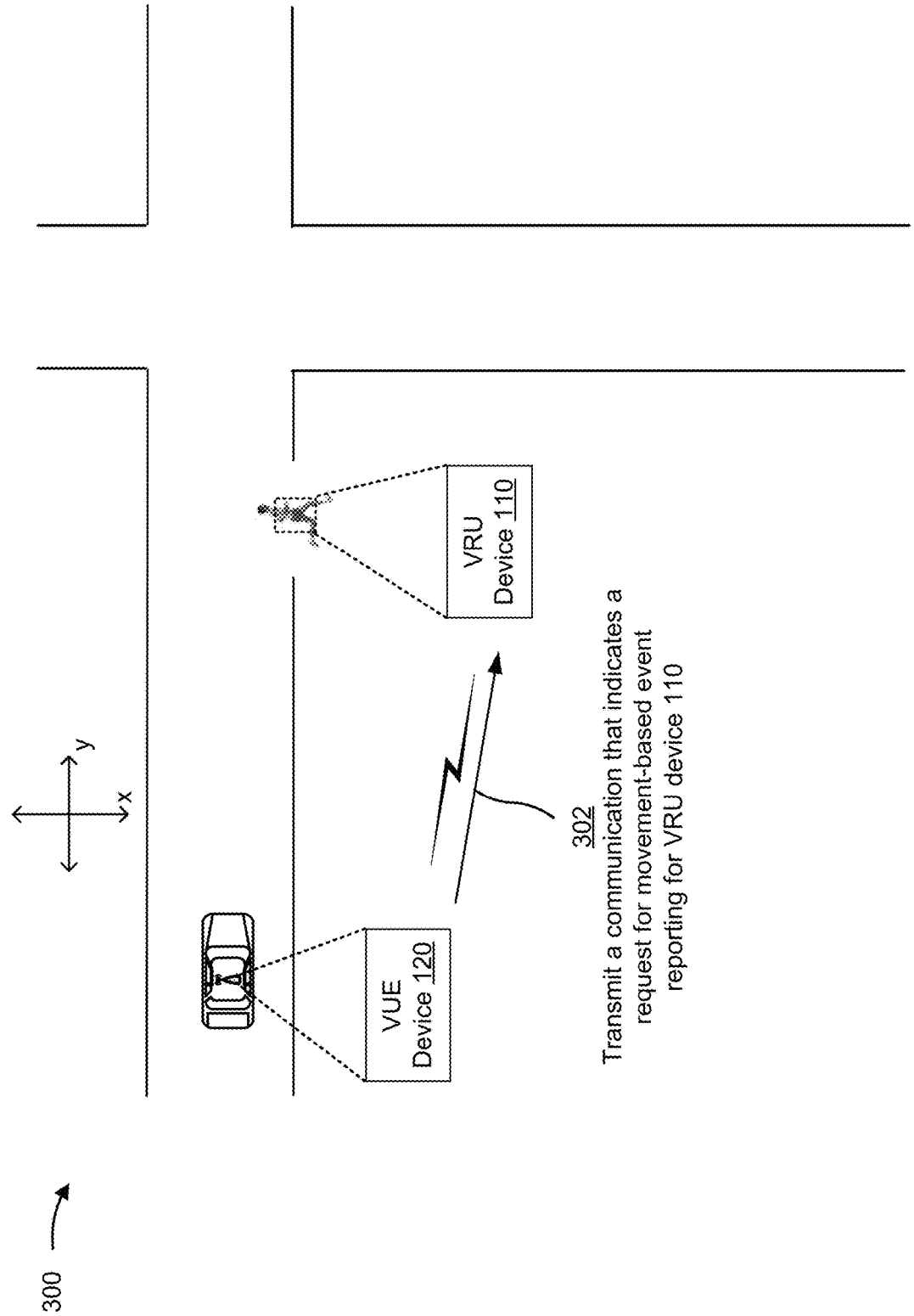
FIGS. 3A-3D are diagrams illustrating one or more examples associated with movement-based event reporting for a VRU device, in accordance with various aspects of the present disclosure.

As shown in FIG. 3A, and by reference number 302, VUE device 120 may transmit a communication that indicates a request for movement-based event reporting for VRU device 110. The communication may be a sidelink communication, such as a PSSCH communication, a PSCCH communication, a V2X communication, a V2P communication, and/or the like.

In some aspects, VUE device 120 may indicates a request for movement-based event reporting for VRU device 110 based at least in part on communicatively connecting with VRU device 110. In some aspects, VUE device 120 may indicates a request for movement-based event reporting for VRU device 110 based at least in part on identifying VRU device 110 in proximity of VUE device 120 or determining that VRU device 110 is within a threshold distance from VUE device 120. In some aspects, VUE device 120 may indicates a request for movement-based event reporting for VRU device 110 based at least in part on determining that VRU device 110 is located on a sidewalk or side of a road on which VUE device 120 is traveling.

In some aspects, the communication may indicates a request for movement-based event reporting for VRU device 110 by indicating a request for VRU device 110 to report one or more types of events associated with movement of VRU device 110. In some aspects, the request for reporting one or more types of events associated with movement of VRU device 110 may include an event reporting configuration identifying the one or more types of events, may include one or more fields or bits indicating the one or more types of events, and/or the like. The one or more types of events may include one or more events associated with absolute movement of the VRU device 110, may include one or more events associated with relative movement of the VRU device 110, may include other types of movement-based events, and/or a combination thereof.

In some aspects, the events for which the VRU device 110 is requested to report may be indicators of unpredictable and/or potentially unsafe movement of VRU device 110. For example, the events may indicate, to VUE device 120, that the speed and/or the direction of movement of VRU device 110 is quickly changing. As another example, the events may indicate that the speed and/or the direction of movement is potentially unsafe (e.g., the direction of movement of VRU device 110 is in a direction that may result in a collision with VUE device 120). As another example, the events may indicate that the speed and/or the direction of movement of VRU device 110 is becoming sporadic and/or irregular. As another example, the events may indicate that the current movement magnitude and direction of VRU device 110 may imminently place the VRU device 110 in a potentially unsafe situation (e.g., the speed and direction of movement of VRU device 110 may indicate that the VRU associated with VRU device 110 is approaching a crosswalk and does not intend to stop). In this way, the events may alert VUE device 120 to more closely monitor VRU device 110 for potential safety issues.

An absolute movement event may be a type of event associated with a particular magnitude of movement or a particular direction of movement of the VRU device 110. For example, an absolute movement event may be a speed of VRU device 110 satisfying a speed threshold, or may be a speed of VRU device 110 satisfying a speed threshold for at least a particular time duration (e.g., in seconds, minutes, and/or the like). As another example, an absolute movement event may be an angle of VRU device 110 (e.g., a yaw angle, a pitch angle, a roll angle, and/or the like) satisfying an angle threshold or being within a particular angle range. As another example, an absolute movement event may be a heading direction of VRU device 110 being within a particular heading direction range (e.g., a heading direction range associated with an axis that is perpendicular to the direction of travel of VUE device 120, such as the x axis indicated in FIG. 3A if the VUE device 120 is traveling along the y axis indicated in FIG. 3A) or within a particular heading direction range for at least a particular time duration. As another example, an absolute movement event may be an angular speed of VRU device 110 satisfying an angular speed threshold.

As another example, an absolute movement event may be a velocity of VRU device 110 satisfying a velocity threshold or satisfying a velocity threshold for at least a particular time duration. As another example, an absolute movement event may be a velocity of VRU device 110 along the axis perpendicular to the direction of travel of VUE device 120, substantially along the axis perpendicular to the direction of travel of VUE device 120, or within a particular range associated with the axis perpendicular to the direction of travel of VUE device 120 satisfying a velocity threshold or satisfying a velocity threshold for at least a particular time duration. As another example, an absolute movement event may be an acceleration of VRU device 110 satisfying an acceleration threshold or satisfying an acceleration threshold for at least a particular time duration. As another example, an absolute movement event may be an acceleration of VRU device 110 along the axis perpendicular to the direction of travel of VUE device 120, substantially along the axis perpendicular to the direction of travel of VUE device 120, or within a particular range associated with the axis perpendicular to the direction of travel of VUE device 120 satisfying an acceleration threshold or satisfying an acceleration threshold for at least a particular time duration.

A relative movement event may be a type of event associated with a change in magnitude of movement of VRU device 110, a change in direction of movement of VRU device 110, a rate of change of the magnitude of movement of VRU device 110, a rate of change of the direction of movement of VRU device 110, and/or the like. For example, a relative movement event may be a change in the speed of VRU device 110 (e.g., a particular amount of increase or decrease in the speed) satisfying a change in speed threshold, or may be a change in speed of VRU device 110 device satisfying a change in speed threshold for at least particular time duration. As another example, a relative movement event may be a change in an angle (e.g., a yaw angle, a pitch angle, a roll angle, and/or the like) of VRU device 110 (e.g., an amount of change in a particular angular direction) satisfying a change in angle threshold. As another example, a relative movement event may be a change in heading direction of VRU device 110 satisfying a change in heading direction threshold or satisfying a change in heading direction threshold for at least a particular time duration. As another example, a relative movement event may be a change in angular speed of VRU device 110 satisfying a change in angular speed threshold.

As another example, a relative movement event may be a change in velocity of VRU device 110 satisfying a change in velocity threshold or satisfying a change in velocity threshold for at least a particular time duration. As another example, a relative movement event may be a change in velocity of VRU device 110 along the axis perpendicular to the direction of travel of VUE device 120, substantially along the axis perpendicular to the direction of travel of VUE device 120, or within a particular range associated with the axis perpendicular to the direction of travel of VUE device 120 satisfying a change in velocity threshold or satisfying a change in velocity threshold for at least a particular time duration. As another example, a relative movement event may be a change in acceleration of VRU device 110 satisfying a change in acceleration threshold or satisfying a change in acceleration threshold for at least a particular time duration. As another example, a relative movement event may be a change in acceleration of VRU device 110 along the axis perpendicular to the direction of travel of VUE device 120, substantially along the axis perpendicular to the direction of travel of VUE device 120, or within a particular range associated with the axis perpendicular to the direction of travel of VUE device 120 satisfying a change in acceleration threshold or satisfying a change in acceleration threshold for at least a particular time duration.

Figure 3B:
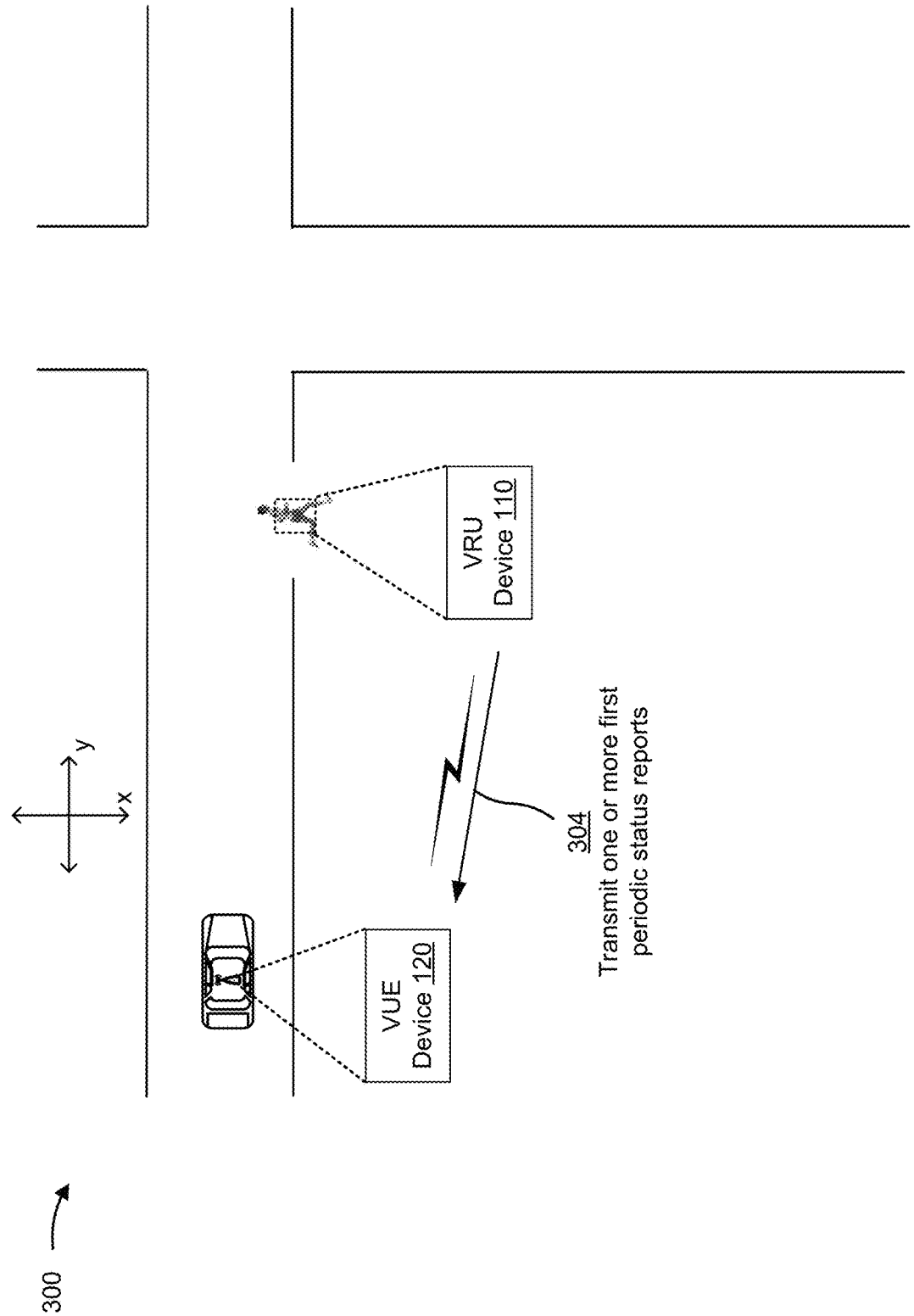

As shown in FIG. 3B, and by reference number 304, VRU device 110 may transmit one or more first periodic status reports to VUE device 120 prior to determining a movement-based event associated with VRU device 110. In some aspects, a periodic status report may include information associated with the location and/or movement of VRU device 110, such as information identifying a location of VRU device 110 (e.g., GPS location data, coordinate information, and/or the like), information identifying a heading of VRU device 110, information identifying a speed, a velocity, and/or an acceleration of VRU device 110, and/or the like.

In some aspects, VRU device 110 may transmit the one or more first periodic status reports to VUE device 120 based at least in part on a reporting frequency for transmitting periodic status reports to VUE device 120. In these cases, VRU device 110 may transmit periodic status reports between particular time durations. In some aspects, the VRU device 110 may transmit the one or more first periodic status reports at a baseline frequency for periodic status reporting. In some aspects, to conserve battery resources, memory resources, processing resources, and radio resources, VRU device 110 may transmit the one or more first periodic status reports at a reduced frequency for periodic status reporting. In reduced frequency cases, the time duration between periodic status report transmissions is greater relative to the time duration between periodic status report transmissions according to the baseline reporting frequency.

In some aspects, VUE device 120 may transmit, to VRU device 110, an indication to transmit the one or more first periodic status reports at the reduced reporting frequency. The indication of the reduced reporting frequency may be included in the communication that indicated a request for movement-based event reporting for VRU device 110 or another sidelink communication. In some aspects, indication of the reduced reporting frequency may be included in the event reporting configuration.

In some aspects, VUE device 120 may determine to indicate a request for (and may indicate a request for) VRU device 110 to transmit the one or more first periodic status reports based at the reduced reporting frequency, based at least in part on determining that VRU device 110 is easily trackable by VUE device 120. VUE device 120 may determine that VRU device 110 is easily trackable based at least in part on the movement (or movement trend) of VRU device 110. For example, VUE device 120 may determine that the movement or historical movement trend of VRU device 110 indicates that VRU device 110 is moving predictably or that changes in the movement of VRU device 110 do not satisfy a threshold.

In some aspects, VRU device 110 may determine to transmit (and may transmit) the one or more first periodic status reports at the reduced reporting frequency based at least in part on determining that VRU device 110 is located proximate or near (e.g., within a threshold distance from) a quantity of VUE devices that does not satisfy a threshold quantity. For example, VRU device 110 may determine that VUE device 120 is the only VUE device located proximate or near VRU device 110, and may determine to transmit the one or more first periodic status reports at the reduced reporting frequency based at least in part on determining that VUE device 120 is the only VUE device located proximate or near VRU device 110. As another example, VRU device 110 may determine that two or more VUE devices are located proximate or near VRU device 110, and may determine to transmit the one or more first periodic status reports at the baseline reporting frequency based at least in part on determining that the quantity of VUE devices located proximate or near VRU device 110 satisfies the threshold quantity.

In some aspects, VRU device 110 may sleep or may transition to an idle mode or an inactive mode between periodic status report transmissions. In some aspects, if VRU device 110 determines that VRU device 110 is located proximate or near a quantity of VUE devices that does not satisfy the threshold quantity, VRU device 110 may still transition out of the idle mode or the inactive mode based at least in part on the baseline reporting frequency to identify the quantity of VUE devices proximate or near VRU device

110. In these cases, if VRU device 110 determines that the quantity of VUE devices proximate or near VRU device 110 changes, while transmitting the one or more first periodic status reports at the reduced reporting frequency, VRU device 110 may transition to transmitting the remaining periodic status reports of the one or more first periodic status reports at the baseline reporting frequency.

Figure 3C:
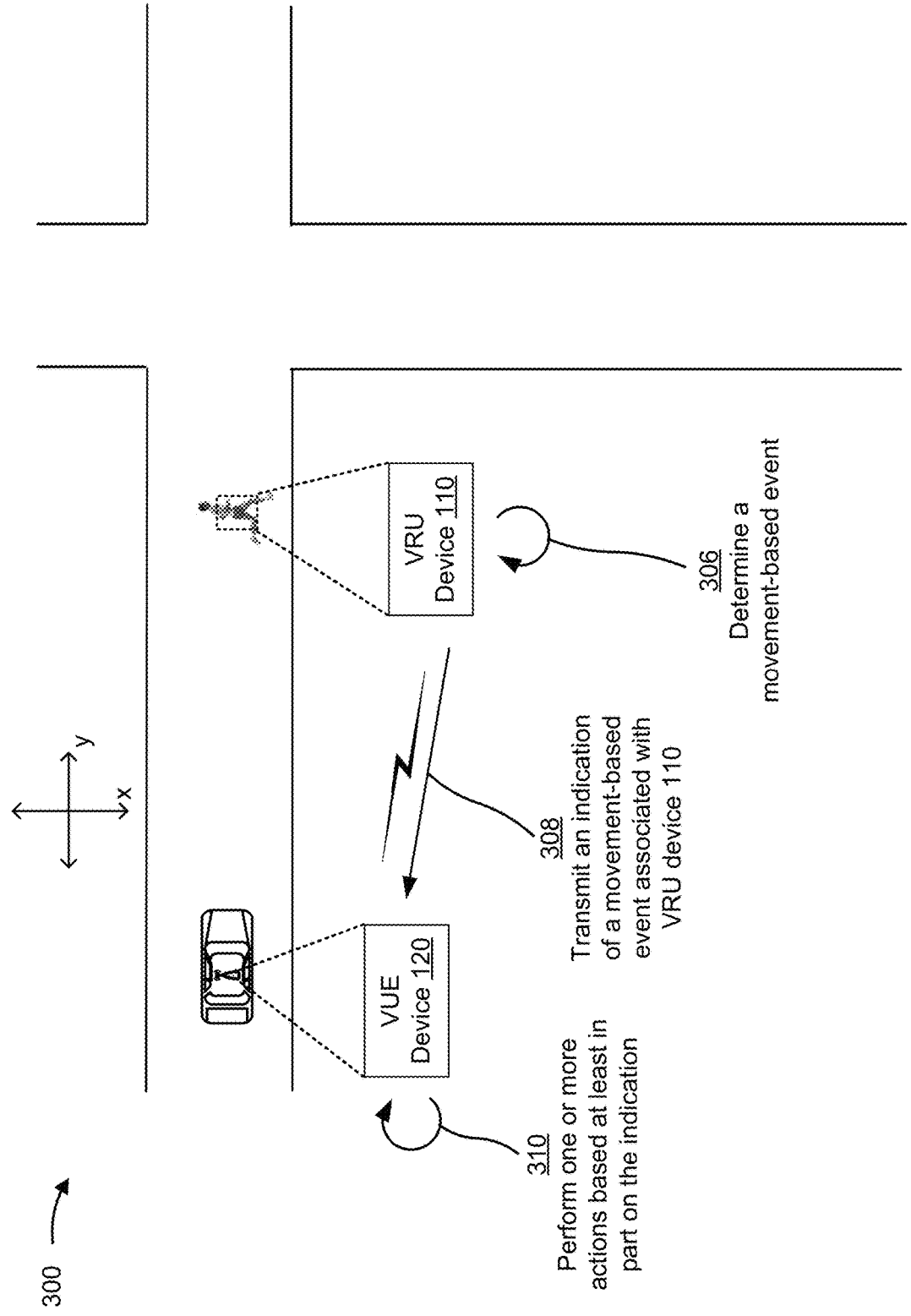

As shown in FIG. 3C, and by reference number 306, VRU device 110 may determine that a movement-based event associated with VRU device 110 has occurred. In some aspects, VRU device 110 may determine that the movement-based event has occurred based at least in part on the requested for movement-based event reporting, based at least in part on receiving the event reporting configuration, and/or the like. As described above, in some aspects, VRU device 110 may receive an indication of a request for movement-based event reporting from VUE device 120. Alternatively to signaling, VRU device 110 may be configured for movement-based event reporting by a manufacturer of VRU device 110 or at a time of deployment of VRU device 110 into service. In these cases the event reporting configuration may be configured and stored on VRU device 110.

In some aspects, VRU device 110 may determine that the movement-based event has occurred by determining that one or more movement parameters associated with VRU device 110 satisfy one or more movement-based thresholds. For example, VRU device 110 may determine that the movement-based event has occurred by determining that one or more movement parameters associated with VRU device 110 satisfy one or more of the movement-based thresholds described above in connection with reference number 302 of FIG. 3A. The one or more movement-based parameters associated with VRU device 110 may be the speed of VRU device 110, an angle (e.g., a yaw angle, a pitch angle, a roll angle, and/or the like) of VRU device 110, a heading direction of VRU device 110, a velocity of VRU device 110, an acceleration of VRU device 110, an angular speed of VRU device 110, and/or the like. In some aspects, VRU device 110 may determine the one or more movement-based parameters associated with VRU device 110 using one or more sensors of VRU device 110, such as a GPS component, an accelerometer, a gyroscope, an actuator, another type of positional or environmental sensor.

As further shown in FIG. 3C, and by reference number 308, VRU device 110 may transmit, to VUE device 120, an indication of a movement-based event associated with VRU device 110. In some aspects, VRU device 110 may transmit the indication of the movement-event based at least in part on determining that the movement-based event has occurred. As indicated above, determining that the movement-based event has occurred may include determining that one or more parameters of the movement of VRU device 110 satisfy one or more movement thresholds associated with a movement-based event for VRU device 110 (e.g., a movement-based event indicated in an event reporting configuration for VRU device 110).

VRU device 110 may transmit the indication of the movement-based event on the sidelink to VUE device 120. In some aspects, VRU device 110 may transmit the indication of the movement-based event in a sidelink communication, such as a PSCCH communication, a PSSCH communication, a V2X communication, a V2P communication, or another type of sidelink communication.

As further shown in FIG. 3C, and by reference number 310, VUE device 120 may receive the indication of the movement-based event and may perform one or more actions based at least in part on the indication. In some aspects, VUE device 120 may perform the one or more actions based at least in part on a combination of the indication, the one or more first periodic status reports, one or more other periodic status reports, other types of information, and/or the like. Examples of actions include transmitting a safety alert or a safety warning to VRU device 110, causing the vehicle associated with VUE device 120 to autonomously slow down or autonomously stop, causing the vehicle to autonomously change the direction of travel of the vehicle, causing the vehicle to autonomously sound a horn of the vehicle, causing the vehicle to display an alert or a warning to the driver and/or a passenger of the vehicle, and/or the like.

Figure 3D:
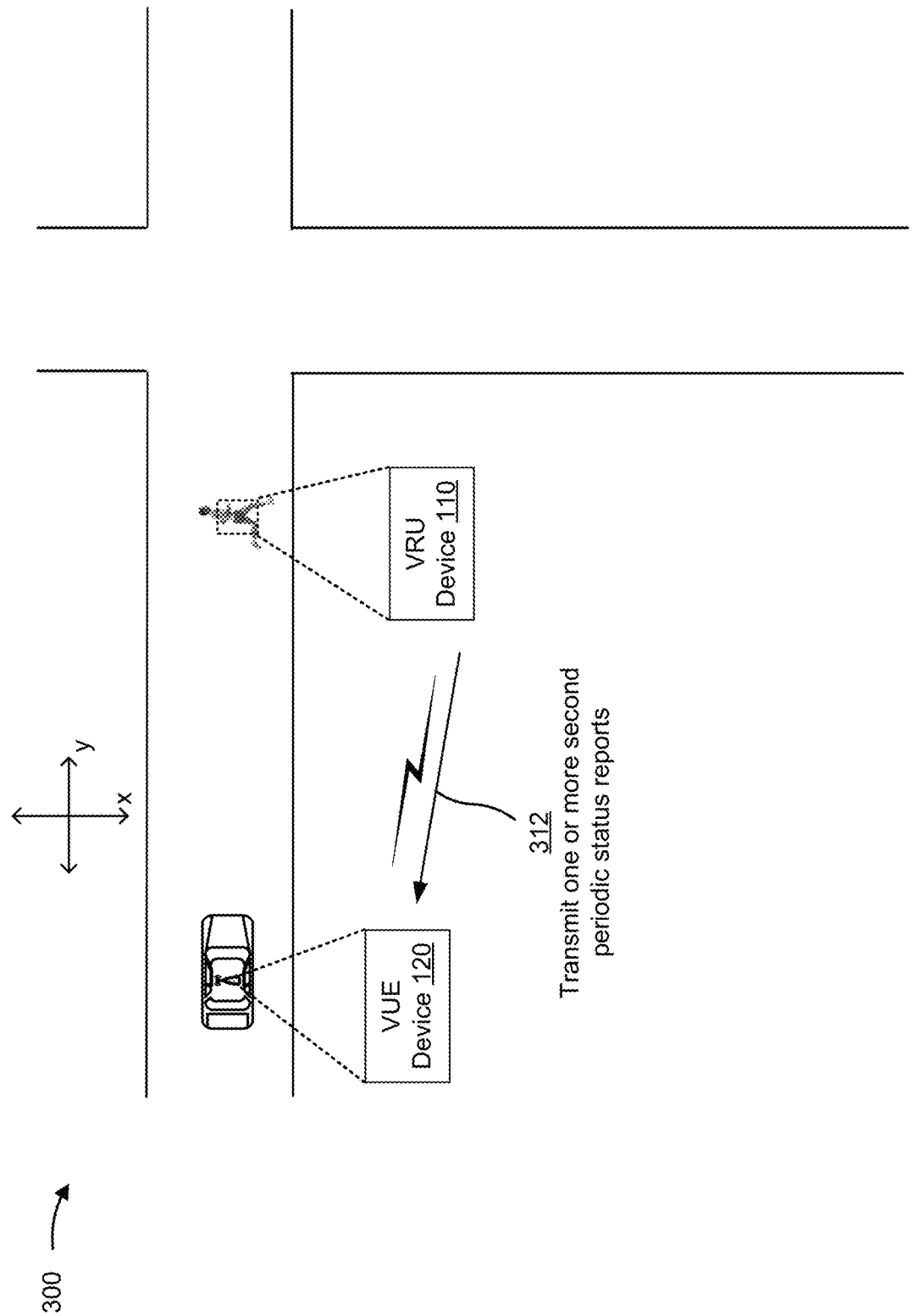

As shown in FIG. 3D, and by reference number 312, VRU device 110 may transmit one or more second periodic status reports to VUE device 120. VRU device 110 may transmit the one or more second periodic status reports after determining that the parameter associated with movement of VRU device 110 satisfies the one or more thresholds. In some aspects, VRU device 110 may transmit the one or more second periodic status reports at the baseline reporting frequency, based at least in part on determining that a movement-based event associated with VRU device 110 has been triggered (e.g., based at least in part on determining that the parameter associated with movement of VRU device 110 satisfies the one or more thresholds).

In this way, VRU device 110 may be requested to provide indications of movement-based events to VUE device 120. The indications of the movement-based events may permit VUE device 120 to more quickly identify (with or without additional information from periodic status reports) impending safety concerns for the VRU associated with VRU device 110, which permits VUE device 120 to more quickly provide alerts to VRU device 110. This increases the safety of the VRU. Moreover, VRU device 110 may be requested to reduce the frequency of periodic status reports prior to determining that a movement-based event has occurred, which increases power efficiency of VRU device 110, conserves battery resources, memory resources, processing resources, and radio resources of VRU device 110, and/or the like.

As indicated above, FIGS. 3A-3D are provided as one or more examples. Other examples may differ from what is described with regard to FIGS. 3A-3D.

Figure 4:
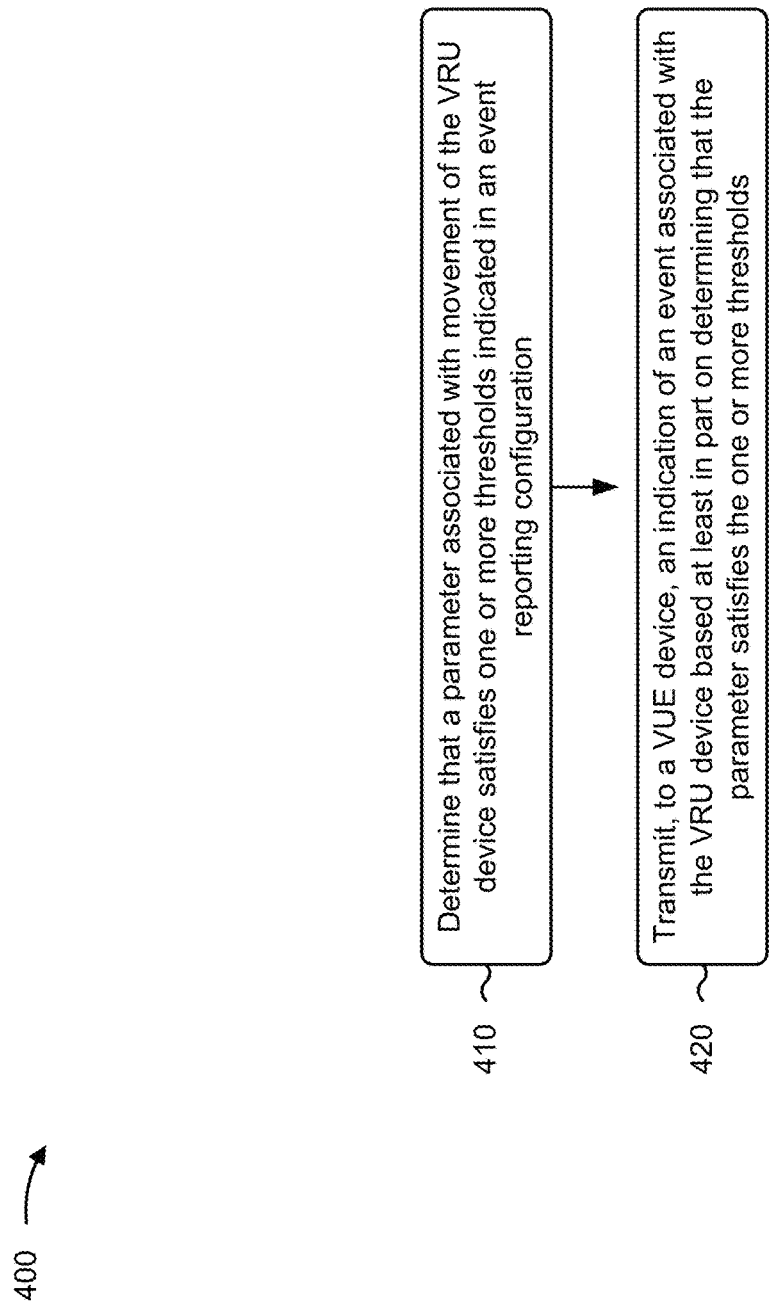
FIGS. 4 and 5 are flow charts of example processes associated with movement-based event reporting for a VRU device, in accordance with various aspects of the present disclosure.

FIG. 4 is a diagram illustrating an example process 400 performed, for example, by a VRU device, in accordance with various aspects of the present disclosure. Example process 400 is an example where the VRU device (e.g., VRU device 110 and/or the like) performs operations associated with movement-based event reporting for a vulnerable road user device.

As shown in FIG. 4, in some aspects, process 400 may include determining that a parameter associated with movement of the VRU device satisfies one or more thresholds indicated in an event reporting configuration (block 410). For example, the VRU device (e.g., using processor 220, memory 230, storage component 240, input component 250, output component 260, communication interface 270, and/or the like) may determine that a parameter associated with movement of the VRU device satisfies one or more thresholds indicated in an event reporting configuration, as described above.

As further shown in FIG. 4, in some aspects, process 400 may include transmitting, to a VUE device, an indication of an event associated with the VRU device based at least in part on determining that the parameter satisfies the one or more thresholds (block 420). For example, the VRU device (e.g., using processor 220, memory 230, storage component 240, input component 250, output component 260, communication interface 270, and/or the like) may transmit, to a VUE device, an indication of an event associated with the VRU device based at least in part on determining that the parameter satisfies the one or more thresholds, as described above.

Process 400 may include additional aspects, such as any single aspect or any combination of aspects described below and/or in connection with one or more other processes described elsewhere herein.

In a first aspect, the event associated with the VRU device includes at least one of an absolute movement event, or a relative movement event. In a second aspect, alone or in combination with the first aspect, the event associated with the VRU device comprises an absolute movement event, and the one or more thresholds indicated in the event reporting configuration include a speed threshold associated with a speed of the VRU device, an angle threshold associated with at least one of a yaw angle, a pitch angle, or a roll angle of the VRU device, the speed threshold and a time duration threshold associated with the speed of the VRU device, a heading direction range threshold and a time duration threshold associated with a heading direction of the VRU device, a velocity threshold associated with a velocity of the VRU device along an axis that is perpendicular to a direction of travel of the VUE device, an acceleration threshold associated with an acceleration of the VRU device along the axis that is perpendicular to the direction of travel of the VUE device, or an angular speed threshold associated with an angular speed of the VRU device.

In a third aspect, alone or in combination with one or more of the first and second aspects, the event associated with the VRU device includes a relative movement event, and the one or more thresholds indicated in the event reporting configuration include a change in speed threshold associated with a speed of the VRU device, a change in angle threshold associated with at least one of a yaw angle, a pitch angle, or a roll angle of the VRU device, the change in speed threshold and a time duration threshold associated with the speed of the VRU device, a change in heading direction threshold and a time duration threshold associated with a heading direction of the VRU device, a change in velocity threshold associated with a velocity of the VRU device along an axis that is perpendicular to a direction of travel of the VUE device, a change in acceleration threshold associated with an acceleration of the VRU device along the axis that is perpendicular to the direction of travel of the VUE device, a change in angular speed threshold associated with an angular speed of the VRU device.

In a fourth aspect, alone or in combination with one or more of the first through third aspects, process 400 includes receiving an indication of the event reporting configuration from the VUE device. In a fifth aspect, alone or in combination with one or more of the first through fourth aspects, the event reporting configuration indicates a reduced frequency for periodic status reporting, where the reduced frequency for periodic status reporting is reduced relative to a baseline frequency for periodic status reporting for the VRU device.

In a sixth aspect, alone or in combination with one or more of the first through fifth aspects, process 400 includes determining that a quantity of VUE devices identified by the VRU device does not satisfy a quantity threshold; and transmitting, based at least in part on determining that the quantity of VUE devices identified by the VRU device does not satisfy the quantity threshold, periodic status reports to the VUE device at the reduced frequency for periodic status reporting, prior to determining that the parameter satisfies the one or more thresholds. In a seventh aspect, alone or in combination with one or more of the first through sixth aspects, process 400 includes periodically identifying nearby VUE devices at the baseline frequency for periodic status reporting for the VRU device.

In an eighth aspect, alone or in combination with one or more of the first through seventh aspects, process 400 includes transmitting one or more first periodic status reports to the VUE device at the reduced frequency for periodic status reporting prior to determining that the parameter satisfies the one or more thresholds; determining, after transmitting the one or more first periodic status reports, that a quantity of VUE devices identified by the VRU device satisfies a quantity threshold; and transmitting one or more second periodic status reports to the VUE device at the baseline frequency based at least in part on determining that the quantity of VUE devices identified by the VRU device satisfies the quantity threshold.

In a ninth aspect, alone or in combination with one or more of the first through eighth aspects, process 400 includes transmitting one or more first periodic status reports to the VUE device at the reduced frequency for periodic status reporting prior to determining that the parameter satisfies the one or more thresholds; and transmitting one or more second periodic status reports to the VUE device at the baseline frequency based at least in part on determining that the parameter satisfies the one or more thresholds. In a tenth aspect, alone or in combination with one or more of the first through ninth aspects, the event reporting configuration is configured for the VRU device prior to deployment of the VRU device.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
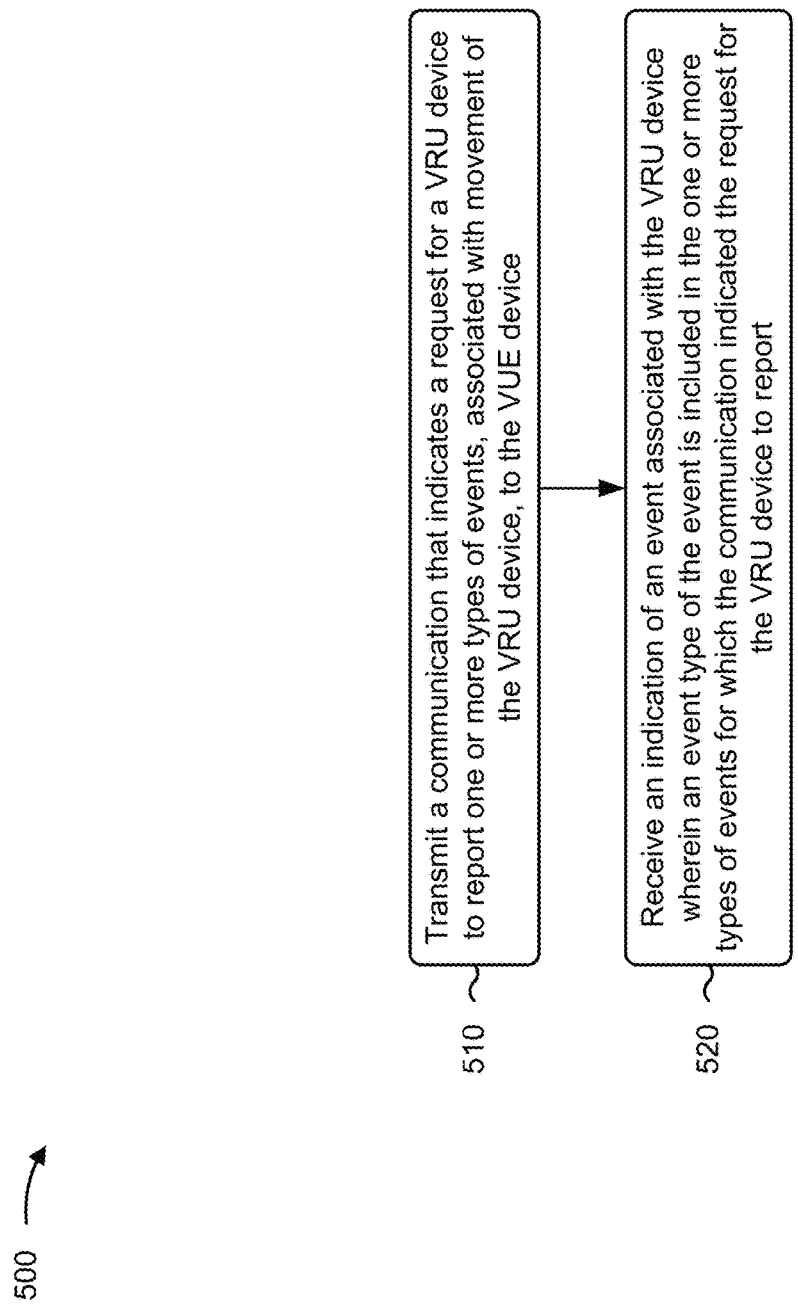

FIG. 5 is a diagram illustrating an example process 500 performed, for example, by a VUE device, in accordance with various aspects of the present disclosure. Example process 500 is an example where the VUE device (e.g., VUE device 120 and/or the like) performs operations associated with movement-based event reporting for a VRU device.

As shown in FIG. 5, in some aspects, process 500 may include transmitting a communication that indicates a request for a VRU device to report one or more types of events, associated with movement of the VRU device, to the VUE device (block 510). For example, the VUE device (e.g., using processor 220, memory 230, storage component 240, input component 250, output component 260, communication interface 270, and/or the like) may transmit a communication that indicates a request for a VRU device to report one or more types of events, associated with movement of the VRU device, to the VUE device, as described above.

As further shown in FIG. 5, in some aspects, process 500 may include receiving an indication of an event associated with the VRU device, wherein an event type of the event is included in the one or more types of events for which the communication indicated the request for the VRU device to report (block 520). For example, the VUE device (e.g., using processor 220, memory 230, storage component 240, input component 250, output component 260, communication interface 270, and/or the like) may receive an indication of an event associated with the VRU device, as described above. In some aspects, an event type of the event is included in the one or more types of events for which the communication indicated the request for the VRU device to report.

Process 500 may include additional aspects, such as any single aspect or any combination of aspects described below and/or in connection with one or more other processes described elsewhere herein.

In a first aspect, the communication indicates a request for periodic status reporting at a first frequency for the VRU device, and process 500 includes receiving, from the VRU device, one or more first periodic status reports at a second frequency based at least in part on the event associated with the VRU device, where the second frequency is greater than the first frequency. In a second aspect, alone or in combination with the first aspect, process 500 includes receiving, from the VRU device, one or more second periodic status reports at the first frequency prior to receiving the indication of the event associated with the VRU device.

In a third aspect, alone or in combination with one or more of the first and second aspects, process 500 includes receiving one or more second periodic status reports from the VRU device; determining, based at least in part on the one or more second periodic status reports, that one or more status reporting parameters for the VRU device satisfy one or more thresholds; and transmitting the communication that indicates the request for periodic status reporting at the first frequency for the VRU device based at least in part on determining that the one or more status reporting parameters for the VRU device satisfy the one or more thresholds. In a fourth aspect, alone or in combination with one or more of the first through third aspects, the one or more types of events include at least one of an absolute movement event, or a relative movement event.

In a fifth aspect, alone or in combination with one or more of the first through fourth aspects, the event type of the event is an absolute movement event, and the absolute movement event includes a speed of the VRU device satisfying a speed threshold, at least one of a yaw angle, a pitch angle, or a roll angle of the VRU device satisfying an angle threshold, the speed of the VRU device satisfying the speed threshold for at least a first time duration, a heading direction of the VRU device being within a heading direction range for at least a second time duration, a velocity of the VRU device along an axis that is perpendicular to a direction of travel of the VUE device satisfying a velocity threshold, an acceleration of the VRU device along the axis that is perpendicular to the direction of travel of the VUE device satisfying an acceleration threshold, or an angular speed of the VRU device satisfying an angular speed threshold.

In a sixth aspect, alone or in combination with one or more of the first through fifth aspects, the event type of the event is a relative movement event, and the relative movement event includes a change in speed of the VRU device satisfying a change in speed threshold, at least one of a change in yaw angle, a change in pitch angle, or a change in roll angle of the VRU device satisfying a change in angle threshold, the change in speed of the VRU device satisfying the change in speed threshold for at least a first time duration, a change in heading direction of the VRU device satisfying a change in heading direction threshold for a second time duration, a change in velocity of the VRU device along an axis that is perpendicular to a direction of travel of the VUE device satisfying a change in velocity threshold, a change in acceleration of the VRU device along the axis that is perpendicular to the direction of travel of the VUE device satisfying a change in acceleration threshold, or a change in angular speed of the VRU device satisfying a change in angular speed threshold.

In a seventh aspect, alone or in combination with one or more of the first through sixth aspects, process 500 includes transmitting a safety warning communication to the VRU device based at least in part on receiving the indication of the event associated with the VRU device.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a vulnerable road user (VRU) device and from a vehicle user equipment (VUE) device, an event reporting configuration that specifies one or more thresholds;
determining, by the VRU device, that a parameter associated with a movement of the VRU device satisfies the one or more thresholds; and
transmitting, by the VRU device and to the VUE device, an indication of an event associated with the VRU device based at least in part on determining that the parameter satisfies the one or more thresholds, wherein the event associated with the VRU device comprises a type of event associated with a rate of change of a direction of movement of the VRU device.

2. The method of claim 1, wherein the event reporting configuration identifies:
an absolute movement event, and
a relative movement event, and
wherein the relative movement event is the type of event associated with the rate of change of the direction of movement of the VRU device.

3. The method of claim 1, wherein the event reporting configuration further specifies one or more different thresholds associated with an absolute movement event; and
wherein the one or more different thresholds comprise:
a speed threshold associated with a speed of the VRU device,
an angle threshold associated with at least one of a yaw angle, a pitch angle, or a roll angle of the VRU device,
the speed threshold and a time duration threshold associated with the speed of the VRU device,
a heading direction range threshold and a time duration threshold associated with a heading direction of the VRU device,
a velocity threshold associated with a velocity of the VRU device along an axis that is perpendicular to a direction of travel of the VUE device,
an acceleration threshold associated with an acceleration of the VRU device along the axis that is perpendicular to the direction of travel of the VUE device, or
an angular speed threshold associated with an angular speed of the VRU device.

4. The method of claim 1,
wherein the one or more thresholds comprise:
a change in speed threshold associated with a speed of the VRU device,
a change in angle threshold associated with at least one of a yaw angle, a pitch angle, or a roll angle of the VRU device,
the change in speed threshold and a time duration threshold associated with the speed of the VRU device,
a change in heading direction threshold,
a change in velocity threshold associated with a velocity of the VRU device along an axis that is perpendicular to a direction of travel of the VUE device,
a change in acceleration threshold associated with an acceleration of the VRU device along the axis that is perpendicular to the direction of travel of the VUE device, or
a change in angular speed threshold associated with an angular speed of the VRU device.

5. The method of claim 1, wherein the event reporting configuration indicates a reduced frequency for periodic status reporting, and
wherein the reduced frequency for periodic status reporting is reduced relative to a baseline frequency for periodic status reporting for the VRU device.

6. The method of claim 5, further comprising:
determining that a quantity of VUE devices identified by the VRU device does not satisfy a quantity threshold; and
transmitting, based at least in part on determining that the quantity of VUE devices identified by the VRU device does not satisfy the quantity threshold, periodic status reports to the VUE device at the reduced frequency for periodic status reporting prior to determining that the parameter satisfies the one or more thresholds.

7. The method of claim 6, further comprising:
periodically identifying nearby VUE devices at the baseline frequency for periodic status reporting for the VRU device.

8. The method of claim 5, further comprising:
transmitting one or more first periodic status reports to the VUE device at the reduced frequency for periodic status reporting prior to determining that the parameter satisfies the one or more thresholds;
determining, after transmitting the one or more first periodic status reports, that a quantity of VUE devices identified by the VRU device satisfies a quantity threshold; and
transmitting one or more second periodic status reports to the VUE device at the baseline frequency based at least in part on determining that the quantity of VUE devices identified by the VRU device satisfies the quantity threshold.

9. The method of claim 5, further comprising:
transmitting one or more first periodic status reports to the VUE device at the reduced frequency for periodic status reporting prior to determining that the parameter satisfies the one or more thresholds; and
transmitting one or more second periodic status reports to the VUE device at the baseline frequency based at least in part on determining that the parameter satisfies the one or more thresholds.

10. The method of claim 1, wherein the one or more thresholds are based at least in part on a movement of the VUE device.

11. The method of claim 1, wherein the parameter is determined to satisfy the one or more thresholds using one or more sensors of the VRU device.

12. A method, comprising:
determining, by a vehicle user equipment (VUE) device, one or more thresholds associated with one or more types of events associated with a movement of a vulnerable road user (VRU) device;
transmitting, by the VUE device, an event reporting configuration that indicates a request for the VRU device to report the one or more types of events, associated with the movement of the VRU device, to the VUE device,
    wherein the event reporting configuration specifies the one or more thresholds; and
receiving, by the VUE device, an indication of an event associated with the VRU device, wherein the event associated with the VRU device comprises a type of event, of the one or more types of events, associated with a rate of change of a direction of movement of the VRU device.

13. The method of claim 12, wherein the event reporting configuration indicates a request for periodic status reporting at a first frequency for the VRU device; and
    wherein the method further comprises:
        receiving, from the VRU device, one or more first periodic status reports at a second frequency based at least in part on the event associated with the VRU device,
            wherein the second frequency is greater than the first frequency.

14. The method of claim 13, further comprising:
receiving, from the VRU device, one or more second periodic status reports at the first frequency prior to receiving the indication of the event associated with the VRU device.

15. The method of claim 13, further comprising:
receiving one or more second periodic status reports from the VRU device;
determining, based at least in part on the one or more second periodic status reports, that one or more status reporting parameters for the VRU device satisfy one or more thresholds; and
transmitting the event reporting configuration that indicates the request for periodic status reporting at the first frequency for the VRU device based at least in part on determining that the one or more status reporting parameters for the VRU device satisfy the one or more thresholds.

16. The method of claim 12, wherein the one or more types of events comprise:
    an absolute movement event, and
    a relative movement event, and
        wherein the relative movement event is the type of event associated with the rate of change of the direction of movement of the VRU device.

17. The method of claim 12,
wherein the one or more types of events further comprise:
    a speed of the VRU device satisfying a speed threshold,
    at least one of a yaw angle, a pitch angle, or a roll angle of the VRU device satisfying an angle threshold,
    the speed of the VRU device satisfying the speed threshold for at least a first time duration,
    a heading direction of the VRU device being within a heading direction range for at least a second time duration,
    a velocity of the VRU device along an axis that is perpendicular to a direction of travel of the VUE device satisfying a velocity threshold,
    an acceleration of the VRU device along the axis that is perpendicular to the direction of travel of the VUE device satisfying an acceleration threshold, or
    an angular speed of the VRU device satisfying an angular speed threshold.

18. The method of claim 12,
wherein the one or more types of events further comprise:
    a change in speed of the VRU device satisfying a change in speed threshold,
    at least one of a change in yaw angle, a change in pitch angle, or a change in roll angle of the VRU device satisfying a change in angle threshold,
    the change in speed of the VRU device satisfying the change in speed threshold for at least a first time duration,
    a change in velocity of the VRU device along an axis that is perpendicular to a direction of travel of the VUE device satisfying a change in velocity threshold,
    a change in acceleration of the VRU device along the axis that is perpendicular to the direction of travel of the VUE device satisfying a change in acceleration threshold, or
    a change in angular speed of the VRU device satisfying a change in angular speed threshold.

19. The method of claim 12, further comprising:
transmitting a safety warning communication to the VRU device based at least in part on receiving the indication of the event associated with the VRU device.

20. A vulnerable road user (VRU) device for wireless communication, comprising:
    a memory; and
    one or more processors coupled to the memory, the one or more processors configured to:
        receive, from a vehicle user equipment (VUE) device, an event reporting configuration that specifies one or more thresholds;
        determine that a parameter associated with a movement of the VRU device satisfies the one or more thresholds; and
        transmit, to the VUE device, an indication of an event associated with the VRU device based at least in part on determining that the parameter satisfies the one or more thresholds, wherein the event associated with the VRU device comprises a type of event associated with a rate of change of a direction of movement of the VRU device.

21. The VRU device of claim 20, wherein the event reporting configuration indicates a reduced frequency for periodic status reporting, and
    wherein the reduced frequency for periodic status reporting is reduced relative to a baseline frequency for periodic status reporting for the VRU device.

22. The VRU device of claim 21, wherein the one or more processors are further configured to:
    determine that a quantity of VUE devices identified by the VRU device does not satisfy a quantity threshold; and
    transmit, based at least in part on determining that the quantity of VUE devices identified by the VRU device does not satisfy the quantity threshold, periodic status reports to the VUE device at the reduced frequency for periodic status reporting prior to determining that the parameter satisfies the one or more thresholds.

23. The VRU device of claim 22, wherein the one or more processors are further configured to:
    periodically identify nearby VUE devices at the baseline frequency for periodic status reporting for the VRU device.

24. The VRU device of claim 21, wherein the one or more processors are further configured to:
    transmit one or more first periodic status reports to the VUE device at the reduced frequency for periodic status reporting prior to determining that the parameter satisfies the one or more thresholds;

determine, after transmitting the one or more first periodic status reports, that a quantity of VUE devices identified by the VRU device satisfies a quantity threshold; and transmit one or more second periodic status reports to the VUE device at the baseline frequency based at least in part on determining that the quantity of VUE devices identified by the VRU device satisfies the quantity threshold.

25. The VRU device of claim 21, wherein the one or more processors are further configured to:

transmit one or more first periodic status reports to the VUE device at the reduced frequency for periodic status reporting prior to determining that the parameter satisfies the one or more thresholds; and transmit one or more second periodic status reports to the VUE device at the baseline frequency based at least in part on determining that the parameter satisfies the one or more thresholds.

26. The VRU device of claim 20, wherein the VRU device is located outside of a vehicle that includes the VUE device.

27. A vehicle user equipment (VUE) device for wireless communication, comprising:

a memory; and one or more processors coupled to the memory, the one or more processors configured to:

determine one or more thresholds associated with one or more types of events associated with movement of a vulnerable road user (VRU) device;

transmit an event reporting configuration that indicates a request for the VRU device to report one or more types of events, associated with a movement of the VRU device, to the VUE device, wherein the event reporting configuration specifies the one or more thresholds; and receive, from the VRU device, an indication of an event associated with the VRU device, wherein the event associated with the VRU device comprises a type of event, of the one or more types of events, associated with a rate of change of a rate of change of a direction of movement of the VRU device.

28. The VUE device of claim 27, wherein the event reporting configuration indicates a request for periodic status reporting at a first frequency for the VRU device; and wherein the one or more processors are further configured to:

receive, from the VRU device, one or more first periodic status reports at a second frequency based at least in part on the event associated with the VRU device, wherein the second frequency is greater than the first frequency.

29. The VUE device of claim 27, wherein the one or more types of events further comprise:

a speed of the VRU device satisfying a speed threshold, at least one of a yaw angle, a pitch angle, or a roll angle of the VRU device satisfying an angle threshold, the speed of the VRU device satisfying the speed threshold for at least a first time duration, a heading direction of the VRU device being within a heading direction range for at least a second time duration, a velocity of the VRU device along an axis that is perpendicular to a direction of travel of the VUE device satisfying a velocity threshold, an acceleration of the VRU device along the axis that is perpendicular to the direction of travel of the VUE device satisfying an acceleration threshold, or an angular speed of the VRU device satisfying an angular speed threshold.

30. The VUE device of claim 27, wherein the one or more types of events further comprise:

a change in speed of the VRU device satisfying a change in speed threshold, at least one of a change in yaw angle, a change in pitch angle, or a change in roll angle of the VRU device satisfying a change in angle threshold, the change in speed of the VRU device satisfying the change in speed threshold for at least a first time duration, a change in velocity of the VRU device along an axis that is perpendicular to a direction of travel of the VUE device satisfying a change in velocity threshold, a change in acceleration of the VRU device along the axis that is perpendicular to the direction of travel of the VUE device satisfying a change in acceleration threshold, or a change in angular speed of the VRU device satisfying a change in angular speed threshold.

31. The VUE device of claim 27, wherein the one or more processors are further configured to:

transmit a safety warning communication to the VRU device based at least in part on receiving the indication of the event associated with the VRU device.

32. The VUE device of claim 27, wherein the one or more thresholds comprise a plurality of thresholds.

* * * * *